Patented Aug. 26, 1952

2,608,532

UNITED STATES PATENT OFFICE 2,608,532

PHOTOCHLORINATION OF ALKYL AROMATICS WITH LIQUID CHLORINE

Francis Earl Lawlor, Niagara Falls, N. Y., assignor to Niagara Alkali Company, New York, N. Y., a corporation of New York No Drawing. Application December 24, 1948, Serial No. 67,245

12 Claims. (Cl. 204—163)

This invention relates to a process of chlorinating certain nuclear chlorinated aromatic compounds having a side chain to replace hydrogen in the side chain with chlorine without the substitution or addition of chlorine in the aromatic nucleus, in which process the chlorination is accomplished by liquid chlorine in the presence of light acting as a catalyst.

Aromatic compounds with a side chain, such as toluene, nitrotoluene, xylene, ethylbenzene, cumene, etc. contain hydrogen attached to a carbon atom in the aromatic nucleus as well as hydrogen attached to an aliphatic carbon atom in the side chain. The attachment of chlorine to these different carbon atoms, either by addition of chlorine or replacement of hydrogen, involve different problems.

In order that the nature of the invention may be fully understood and distinguished from other chlorination processes, it is believed desirable to point out that there are at least two general types of chlorination reactions in which chlorine becomes attached to carbon, namely, addition and substitution, which can be applied to at least two different types of carbon atoms, namely, aromatic and aliphatic. Examples are the addition of chlorine to unsaturated aliphatic compounds, such as ethylene, to form chlorinated saturated hydrocarbons, such as ethylene dichloride, the addition of chlorine to aromatic hydrocarbons to form chlorinated hydrocarbons of the alicyclic series, such as the chlorination of benzene to hexachlorocyclohexane, and the chlorination of an aromatic compound with an unsaturated side chain to add chlorine in the side chain or the nucleus, or both. In this type of chlorination there is no formation of hydrogen chloride as a by-product. The reaction proceeds with relatively great ease and, in fact, one of the difficulties in many instances is to prevent it from proceeding too fast. The reaction of these unsaturated aliphatic and aromatic compounds involves considerations peculiar to this type of addition reaction, and the invention is to be distinguished therefrom.

The substitution chlorination processes, on the other hand, involve an entirely different type of reaction and one to be distinguished from the addition type of chlorination processes. For example, ethane may have two hydrogens substituted by a chlorine to form dichloroethane and two molecules of hydrogen chloride. Benzene can be substitutively chlorinated to form hexachlorobenzene. In the case of an aromatic compound with a side chain such as toluene, the possibilities of reaction become greater, i. e., hydrogen attached to nuclear carbon may be substituted by chlorine, or hydrogen attached to aliphatic side chain carbon may be substituted by chlorine, or both. These possibilities for reaction of chlorine with an aromatic compound having a side chain, especially when considered with the possibility of addition of chlorine to the nucleus, either with or without substitution of hydrogen in the side chain, offer a large number of possibilities, and the accomplishment of any one of such reactions to the exclusion of the others is particularly difficult. Furthermore, in the chlorination of aromatic compounds with a side chain, it is essential that the side chain not be removed from the nucleus if the essential character of the compound is to be retained. This is an important consideration since common chlorinating processes have a tendency to remove the side chain.

In the usual chlorination method the compound to be chlorinated is treated with gaseous chlorine. This requires that the compound be in the liquid form in order that the chlorine may be effectively contacted with the compound. When the compound has a high melting point the high temperature required to maintain the compound in molten form is apt to cause side reactions or decomposition. In the case of pentachlorotoluene as the starting material, (which has a melting point above 220° C.) the high temperature is apt to cause the removal of the methyl group. In fact, the liability of the methyl group is apparent when an attempt is made to make pentachlorotoluene from toluene using gaseous chlorine. The high temperature required to keep the mixture molten while introducing the fifth chlorine atom tends to decompose the compound and split off the methyl group. Thus toluene chlorinated under high temperature conditions with gaseous chlorine usually results in the removal of the methyl group to produce hexachlorobenzene. The prior art processes of chlorinating compounds of the type here involved, for instance the production of pentachlorobenzal chloride from pentachlorotoluene, involve difficulties of operation and give poor yields for the reasons mentioned above. Beilstein and Kuhlberg, Ann. 150, 306–308 (1869) state that the introduction of chlorine into pentachlorotoluene is accomplished with great difficulty, which is understandable from the previous explanation. For that reason they started with benzal chloride, chlorinated it in the presence of iodine as far as possible, isolated the tri- and tetrachlorobenzal chloride, and chlorinated again using antimony chloride as a catalyst.

The product was isolated by washing, distillation and crystallization from 80% alcohol to separate pentachlorobenzal chloride from tetrachlorobenzotrichloride. No yield figures are given, but they must be quite low because of the many manipulations required.

Lock, Ber. 66, 1533 (1933), states that Beilstein and Kuhlberg were in error and they carried out the chlorination of pentachlorotoluene at its melting point (210–230°) in 2 to 3 hours, by passing in chlorine gas until the weight gain was about theoretical. The product was recrystallized from a mixture of benzene and petroleum ether, but the yield left much to be desired in a commercial process. The difficulty with this process is that it must be carried out at the temperature of the melting point of the pentachlorotoluene, and at this temperature it is difficult to prevent side reactions including the removal of the side chain.

Similar problems are involved in the chlorination of other side chain chlorinated methyl benzenes, such as the side chain chlorination of tetrachloroxylene, which has a melting point above 220° C. Thus pentachlorobenzalchloride and tetrachloroxylene chlorides cannot be made efficiently by such processes.

An alternative is to use a solvent such as carbon tetrachloride or sulfuryl chloride to dissolve the compound to be chlorinated, and then pass in gaseous chlorine in solution. However, this is undesirable because of problems incident to solvent recovery. In addition it is difficult to find inert compounds which are good solvents, and carbon tetrachloride is relatively poor in this connection. Other materials such as sulfuryl chloride are very corrosive and require special equipment.

It has been discovered, in accordance with the broadest aspect of the invention, that certain nuclear substituted aromatic compounds with side chains may be chlorinated to replace at least a part of the side chain hydrogen with chlorine without affecting the nucleus. The compound to be chlorinated is dissolved in liquid chlorine, and while maintaining the chlorine in a liquid state, subjecting the solution to reaction conditions, i. e., the use of suitable temperatures, and/or the exposure to light acting as a catalyst. This process permits the use of relatively low temperatures, particularly as contrasted with the prior art temperatures. The chlorination results from a substitution of chlorine for hydrogen in the side chain, which liberates hydrogen chloride. The process can be applied to compounds in which a sufficient number of hydrogens have been substituted in the nucleus to render the nucleus resistant to additive chlorination under the reaction conditions. These compounds will be described in more detail subsequently. The reaction is exothermic, and may proceed until the desired extent of the side-chain chlorination is obtained. The reaction may be stopped at any time by cooling the reaction vessel below the reaction temperature or withdrawing the source of light. After the reaction is terminated, the resulting chlorinated compound can be recovered by the evaporation of the liquid chlorine.

My invention is based on the unobvious discovery that aromatic compounds of the above described type having a side chain can have at least a part of the side chain hydrogen replaced by chlorine, if liquid chlorine is used as the solvent and the chlorinating agent in the presence of light. It is especially noteworthy that chlorine or hydrogen attached to aromatic carbon atoms is not disturbed, nor is chlorine added.

The liquid chlorine not only acts as the chlorinating agent but also functions as the solvent or medium for the reacting components and in most cases also for the chlorinated products. While it is not intended that the invention should be limited to any theory, it is believed that the solvent action of the liquid chlorine, which acts to bring a high concentration of chlorine into intimate contact with the aromatic compound, may be largely responsible for the desirable results obtained. Since the compound to be chlorinated is in solution in the chlorine, it is subjected to the highest possible concentration of chlorine. This is to be distinguished from the use of gaseous chlorine where the chlorine is in solution in the compound and the concentration of chlorine is limited by the solubility of chlorine in the compound.

In addition to the above desirable and unique reaction, the invention also has other advantages which accrue from the use of liquid chlorine, more particularly the use of the same medium as the solvent and chlorinating agent, thus eliminating the need for a separate solvent; the elimination of pyrolytic decomposition by the use of lower temperatures and the resulting production of products having high purity; the enhanced contact of the chlorine with the compound to be chlorinated with the chlorine, thus minimizing or eliminating prolonged agitation and long reaction times; the ability to use ordinary equipment in many instances; the control of the reaction and the temperature through self-refrigeration by evaporation of the liquid chlorine solvent; the ability to use such vented gases in a separate prechlorination step to exhaust the chlorine from the hydrogen chloride by-product; the facility with which the process can be operated; and other advantages that will be apparent from a reading of the following description of suitable modes of practicing the invention.

The process of my invention may be carried out as a batch operation or as a continuous operation. In a batch type operation, the liquid chlorine and the compound to be chlorinated may be added to the reactor in any sequence. Generally means are provided to assure a solution of the compound in the chlorine in a single homogeneous reaction phase. If the compound to be chlorinated is a solid, any expedient may be resorted to for facilitating the introduction of the solid into liquid chlorine, such as by agitation. To facilitate such a controlled introduction, if the compound to be chlorinated is solid, it may be melted, or it may be dissolved in a small amount of a solvent which may be recovered subsequently. The use of an inert solvent under such circumstances is not excluded provided the conditions are such as to maintain the chlorine in the liquid phase, so as to provide a homogeneous solution comprising the liquid chlorine and the compound to be chlorinated in which the liquid chlorine is the primary solvent. Most of the materials to be chlorinated are sufficiently soluble in liquid chlorine, so that in the preferred embodiment of the invention any solvent other than chlorine is avoided.

The reaction is started by exposing to light. The reaction rate is reduced or controlled in most cases through cooling, as explained hereinafter, or by regulating the intensity of the light, or both.

In a continuous type process the stream of chlorine and the compound to be chlorinated may be metered into a reaction zone, the temperature of which may be controlled or varied, and then passed to a chlorine recovery zone.

The proportions of the compound to be chlorinated and the liquid chlorine can vary over a relatively wide range. It is important that the amount of chlorine be at least sufficient to dissolve the compound and to provide a single homogeneous liquid phase during the reaction. The amount of chlorine will always be more than the theoretical amount required for chlorination, i. e., more than enough to replace so much of the hydrogen in the side chain as desired. If liquid chlorine is to be used in the nuclear chlorination to form the starting material, the amount of liquid chlorine must be more than enough for this reaction also. It is preferred that the amount of chlorine be sufficient to dissolve all of the chlorinated compound obtained at the end of the reaction if it is soluble in liquid chlorine. Commercial economy suggests the use of the minimum amount of chlorine within the above range.

The reaction with liquid chlorine is usually carried out in the presence of light. The liquid chlorine containing the compound may be exposed to light in any way, such as by carrying out the reaction in a glass vessel, or a vessel with a glass window, or a bulb or light source located within an opaque reactor. Since the light is preferred for the proper control of the reaction, it is preferable that high temperatures or other reaction effecting expedients not be employed in the absence of light.

The chlorination process of the invention is conducted at any temperature at which the desired reaction proceeds at a suitable rate in the presence of light, depending on the degree of chlorination wanted, provided that the temperature is sufficiently high to cause substitution of chlorine for hydrogen in the side chain under the conditions of light used. For most compounds a temperature within the range of $-34°$ C. (B. P. of liquid chlorine) up to about 80° to 90° C. is satisfactory. In many instances temperatures in the range of 20 to 35° C. may be used, it being unnecessary in most instances to exceed 50° C. The ability to use such low temperature is an advantage that is readily apparent.

In all instances the pressure must be such as to maintain the chlorine in the liquid phase at the temperature employed, but higher pressures, such as are obtained by an inert gas or with the hydrogen chloride by-product, are contemplated as within the invention.

At the conclusion of the reaction the chlorine may be separated, for example, it may be evaporated and condensed for reuse, and the chlorinated compound remains. Generally it is in sufficiently pure condition after the separation of the chlorine so as not to require further purification.

The invention is applicable to aromatic compounds having a side chain containing chlorine-replaceable hydrogen, which compounds have been substituted in the nucleus to such an extent that they are resistant to additive nuclear chlorination during the reaction which comprises the invention. For instance, trichlorotoluene may be chlorinated in accordance with the invention to make trichlorobenzal chloride, whereas toluene is not resistant to nuclear additive chlorination which takes place when an attempt is made to substitute hydrogen on the side chain, thus destroying the aromaticity of the compound.

In general, the substitution of three chlorines in a mononuclear compound renders the compound resistant to additive chlorination. Illustrative of the aromatic side chain compounds which may be chlorinated in accordance with the invention are nuclear chlorinated toluene, xylene, ethylbenzene and cumene, each having at least three substituted chlorine atoms in the nucleus. In the case of aromatic compounds containing a larger number of branched chains, such as mesitylene which contains three methyl side groups, the introduction of two chlorines is usually sufficient, although trichloromesitylene may be used as the starting material, and in the case of durene which has only two nuclear hydrogens, it is of course impossible to substitute more than these two. The compounds may contain any number of permissible side chains as long as the compound is resistant to additive chlorination. Compounds may be mononuclear or have two or more condensed or interconnected rings. Groups or atoms other than chlorine may be substituted in the nucleus to form a compound that is sufficiently resistant to additive chlorination under appropriate conditions, such as hexamethyl benzene. Other nuclear chlorinated aromatic compounds with chlorine replaceable side chain hydrogens along with other groups, such as the hydroxy, carboxy, nitro, sulfonic and amino groups, may be chlorinated in accordance with the invention. Examples of such compounds are nuclear substitutively chlorinated cresol, toluic acid, nitrotoluene, tolylsulfonic acid, etc. In the case of compounds containing another group as well as a hydrocarbon side chain, the amount of chlorine or other substituent in the nucleus may be considerably less and still have the nucleus resistant to additive chlorination because of the effect of such other groups in hindering additive chlorination.

In view of the above explanation, it will be seen that the exact amount of nuclear substitution which renders the compound resistant to additive chlorination cannot be specified numerically in all instances because of the many factors involved, but in view of this explanation it is believed that one skilled in the art will clearly understand what is meant by the expression as used herein, that the compound is resistant to additive nuclear chlorination. Especially is this so since the well-known laws of steric hindrance and the directing effects of groups and atoms (including chlorine) either in the aromatic nucleus or in the side chain can be considered in determining the starting compounds and the extent of the chlorination obtainable. These principles are well known to the skilled chemist in determining what kinds and types of substituted aromatic compounds may have chlorine substituted for hydrogen in the side chain without additive nuclear chlorination. For instance, in the chlorination of pentachlorotoluene in accordance with the invention, the presence of nuclear chlorine at the 2 and 6 positions interferes with the introduction of more than 2 chlorines on the side chain in the 1 position. On the other hand, 2,3,4- or 2,4,5-trichlorotoluene can have all three hydrogens on the methyl group in the 1 position replaced by chlorine. Similarly, tetrachloroparaxylene is difficult to chlorinate in the side chains beyond a total of 3 chlorine atoms due to the well known laws referred to. Similar considerations apply to the kind and position of other groups.

It is not believed that the method of the invention renders it possible, at least in many instances, to accomplish a type or extent of chlorine substitution in a side chain which is entirely contradictory to established chemical principles. Rather the process of the invention greatly increases the speed and facilitates the reaction in those cases where known chemical principles would indicate that substitution chlorination in a side chain were possible. More particularly, since the invention permits the use of lower temperatures to achieve an equilibrium within a reasonable length of time, it may be possible to prepare compounds which could not be made by other processes because the speed of reaction in such other processes would be too slow for practical purposes and higher temperatures would be apt to decompose the compounds or unduly emphasize side reactions.

The nuclear chlorinated compound which is resistant to additive chlorination, which is employed as the starting material, may be made by any known process. It is convenient to make it, for example, by chlorinating the side chain compound or a partially chlorinated side chain compound, with liquid chlorine in the presence of a chloride chlorinating catalyst, such as iron chloride, at a temperature that does not affect (remove or chlorinate) the side chain. If the starting material is to be fully substitutively chlorinated in the nucleus, such as pentachlorotoluene, the reaction mixture from the nuclear substitution chlorination (liquid chlorine, the nuclear chlorinated side chain compound and the chloride catalyst) can serve as the starting mixture and the chlorine can be substituted in the side chain under the appropriate reaction conditions. Thus pentachlorobenzal chloride, for example, may be made from toluene by chlorinating with liquid chlorine and a chloride chlorinating catalyst to form pentachlorotoluene at a relatively low temperature, following which the reaction conditions are adjusted, i. e., exposure to light and temperature adjustment to effect the side chain substitution.

If the starting material is not to be fully chlorinated but rather only chlorinated to the minimum extent to render it resistant to additive chlorination, it is necessary to remove the chloride chlorinating catalyst before proceeding with the side chain chlorination, if such a catalyst has been used. Alternatively, the starting material can be made by nuclear chlorinating the side chain aromatic compound with gaseous chlorine to such a point as to render it resistant to additive chlorination.

During the reaction to substitute hydrogen by chlorine, hydrogen chloride is liberated and the pressure rises in the reaction vessel because the physical constants of hydrogen chloride are such that it is not condensed to a liquid under the usual reaction conditions, and it is not appreciably soluble in the reaction mixture or in liquid chlorine.

The reaction is exothermic and an increase in temperature and pressure may be prevented or readily controlled by venting gas from the reaction. This self-refrigerating effect of controlling the nature and extent of the reaction is an important advantage of the process. If the gas (which is a mixture of hydrogen chloride and chlorine) is passed through a reflux condenser before venting, a substantial part of the chlorine vapors can be condensed and returned to the reaction vessel. The operation of the condenser can be regulated to determine the amount and temperature of the chlorine returned, and in this way the reaction can be additionally controlled. The vented gases will then comprise all of the hydrogen chloride, and a part or substantially none of the chlorine depending on the operation of the reflux condenser. The temperature may be varied during the chlorination, i. e., it may be raised as the reaction nears the end, for example, by applying heat to the reaction vessel by controlling the amount of evaporation and the operation of the reflux condenser.

The by-product hydrogen chloride containing some chlorine may be used, for example, in a countercurrent process in which the vented gases containing hydrogen chloride and chlorine, for example, may be used to form the nuclear chlorination resistant starting material, such as toluene, through the stage where chlorination readily proceeds with gaseous chlorine. The production of nuclear-chlorinated toluene as the starting material can be made in this way by stripping chlorine from the hydrogen chloride by-product gas.

In order to illustrate and point out some of the advantages of the invention, the following specific embodiments are included. These are for illustrative purposes only and are not to be construed as limitations on the invention as it is otherwise disclosed and claimed herein.

Example 1

75 g. pentachlorotoluene was placed in a glass pressure vessel suitably equipped with a reflux condenser, instruments for measuring pressure and temperature, and a safety rupture disc. 1630 g. liquid chlorine was added and the vessel illuminated with a 150 watt incandescent electric lamp. The vessel was maintained at 30° C. for 5 hours and 10 minutes at a pressure to maintain the chlorine liquid. The pentachlorotoluene slowly dissolved and then plate-like crystals were deposited on the walls of the vessel. The excess chlorine was evaporated, leaving a mass of loose crystals having a M. P. of 118–119.5° C. and a chlorine analysis of 74.7%, indicating it to be pentachlorobenzal chloride ($C_6Cl_5CHCl_2$). (M. P. pure pentachlorobenzal chloride 119.5° C.—chlorine content of pentachlorobenzal chloride 74.5%.) The yield was quantitative.

Example 2

25 g. 2,4,5-trichlorotoluene M. P. 78–80.5° C. was placed in a glass pressure vessel suitably equipped with a reflux condenser, instruments for measuring pressure and temperature, and a safety rupture disc. 1630 g. liquid chlorine was added and the vessel illuminated with a 200 watt incandescent light. The vessel and contents were brought up to 27° C. and held there for 3¾ hours at a pressure to maintain the chlorine liquid. At the conclusion of the reaction the excess chlorine was evaporated. Upon recrystallization of the product from methanol there was obtained white needles having a M. P. of 79–81° C. and a Cl analysis of 71.5% (theoretical for 2,4,5-trichlorobenzotrichloride: M. P. 82° C.; Cl content: 71.2%).

Example 3

75 g. ethyl pentachlorobenzene was placed in the glass pressure vessel as in Example 1. 1550 g. liquid chlorine was added and the vessel illuminated with a 150 watt incandescent electric lamp. The chlorine was vented through a bottle of water to absorb the hydrogen chloride evolved.

After 4 hours and 10 minutes at 25-28° C., and at a pressure to maintain the chlorine liquid, excess chlorine was evaporated leaving a residue having a chlorine analysis of 74.5% which corresponds to that of trichloroethyl pentachlorobenzene. Recrystallization gave a product having a M. P. of 87-93.5° C.

*Example 4*

Following generally the procedure of Examples 1 to 3, tetrachloroxylene was chlorinated for 5 hours at 30° C. to form the compound

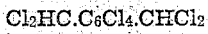
$Cl_2HC.C_6Cl_4.CHCl_2$

In view of the foregoing disclosures, variations and modifications thereof will be apparent to one skilled in the art. The invention contemplates all such modifications and variations as come within the scope of the appended claims.

I claim:

1. A process of substitution chlorination of a chlorine-soluble aromatic compound substitutively chlorinated in the nucleus so as to be resistant to additive nuclear chlorination under the hereinaftermentioned chlorinating conditions and having at least one alkyl side chain to substitute chlorine-replaceable side chain hydrogen with chlorine without altering the structure of the nucleus, which comprises dissolving said compound in liquid chlorine, and in the presence of light, maintaining a temperature at which the chlorine replaces hydrogen in an alkyl side chain as the primary reaction and not in excess of about 80° C. to minimize side reactions, and a pressure to keep the chlorine in the liquid phase.

2. A process of substitution chlorination of a chlorine-soluble aromatic compound substitutively chlorinated in the nucleus so as to be resistant to additive nuclear chlorination under the hereinaftermentioned chlorinating conditions and having at least one side chain to substitute chlorine-replaceable side chain hydrogen with chlorine without altering the structure of the nucleus, which comprises dissolving said compound in liquid chlorine, and in the presence of light, maintaining a temperature at which the chlorine replaces hydrogen in a side chain as the primary reaction and not in excess of about 80° C. to minimize side reactions, maintaining a pressure to keep the chlorine in the liquid phase at said temperature, and thereafter removing uncombined chlorine from the chlorinated compound.

3. A process of substitution chlorination of a chlorine-soluble aromatic hydrocarbon having at least three nuclear-substituted chlorine atoms so as to be resistant to additive nuclear chlorination under the hereinaftermentioned chlorinating conditions and having at least one alkyl side chain to substitute chlorine-replaceable side chain hydrogen with chlorine without altering the structure of the nucleus, which comprises dissolving said compound in liquid chlorine, and in the presence of light, maintaining a temperature at which the chlorine replaces hydrogen in an alkyl side chain as the primary reaction and not in excess of about 80° C. to minimize side reactions, maintaining a pressure to keep the chlorine in the liquid phase at said temperature, and thereafter removing uncombined chlorine from the chlorinated compound.

4. A process of substitution chlorination of a chlorine-soluble aromatic hydrocarbon having at least three nuclear-substituted chlorine atoms so as to be resistant to additive nuclear chlorination under the hereinaftermentioned chlorinating conditions and having at least one alkyl side chain to substitute chlorine-replaceable side chain hydrogen with chlorine without altering the structure of the nucleus, which comprises dissolving said compound in liquid chlorine, and in the presence of light, regulating the reaction between the compound and the chlorine by maintaining a temperature at which the chlorine replaces hydrogen in an alkyl side chain as the primary reaction and not in excess of about 80° C. to minimize side reactions, venting gaseous hydrogen chloride and chlorine from the reaction mass while maintaining a pressure to keep the chlorine in the liquid phase at the temperature maintained, continuing the reaction with the liquid chlorine until the evolution of hydrogen chloride substantially ceases at the temperature maintained, and thereafter removing uncombined chlorine from the chlorinated compound.

5. A process of substitution chlorination of a chlorine-soluble mononuclear aromatic hydrocarbon fully substitutively chlorinated in the nucleus so as to be resistant to additive nuclear chlorination under the hereinafter-mentioned chlorinating conditions and having one alkyl side chain of not over four carbon atoms to substitute chlorine-replaceable side chain hydrogen with chlorine without altering the structure of the nucleus, which comprises dissolving said compound in liquid chlorine, and in the presence of light, maintaining a temperature at which the chlorine replaces hydrogen in the alkyl side chain as the primary reaction and not in excess of about 80° C. to minimize side reactions, maintaining a pressure to keep the chlorine in the liquid phase at said temperature, and thereafter removing uncombined chlorine from the chlorinated compound.

6. A process of substitution chlorination of a chlorine-soluble mononuclear aromatic hydrocarbon having at least three nuclear substituted chlorine atoms so as to be resistant to additive nuclear chlorination under the hereinafter-mentioned chlorinating conditions and having at least one methyl side chain to substitute chlorine-replaceable side chain hydrogen with chlorine without altering the structure of the nucleus, which comprises dissolving said compound in liquid chlorine, and in the presence of light, regulating the reaction between the compound and the chlorine by maintaining a temperature at which the chlorine replaces hydrogen in a methyl group as the primary reaction and not in excess of about 80° C. to minimize side reactions, venting gaseous hydrogen chloride and chlorine from the reaction mass while maintaining a pressure to keep the chlorine in the liquid phase at the temperature maintained, continuing the reaction with the liquid chlorine until the evolution of hydrogen chloride substantially ceases at the temperature maintained, and thereafter removing uncombined chlorine from the chlorinated compound.

7. A process of chlorinating chlorinated toluene having at least three nuclear substituted chlorine atoms so as to be resistant to additive nuclear chlorination under the hereinafter-mentioned chlorinating conditions and in which at least one of the chlorine-replaceable hydrogens in the methyl group in the toluene is replaced with chlorine without altering the structure of the nucleus, which comprises dissolving said compound in liquid chlorine, and in the presence of light, regulating the speed and extent of the reaction between said compound and the chlorine by maintaining a temperature at which the chlorine replaces hydrogen in the methyl group as the primary reaction and not in excess of about 80° C. to minimize side reactions, and a pressure at which the chlorine is in the liquid phase, and thereafter removing uncombined chlorine from the chlorinated compound.

8. A process of forming pentachlorobenzal chloride, which comprises dissolving pentachlorotoluene in liquid chlorine, and in the presence of light, maintaining a temperature of about 30° C. to replace two of the side chain hydrogens with chlorine without altering the structure of the nucleus, venting gaseous hydrogen chloride and chlorine from the reaction mass while maintaining a pressure to keep the chlorine in the liquid phase at the temperature maintained, continuing the reaction with the liquid chlorine until the evolution of hydrogen chloride substantially ceases at the temperature maintained, and thereafter removing uncombined chlorine from the chlorinated compound.

9. A process of forming pentachlorobenzal chloride which comprises dissolving pentachlorotoluene in liquid chlorine, and in the presence of light, maintaining a temperature at which chlorine replaces hydrogen in the methyl group of the pentachlorotoluene as the primary reaction and not in excess of about 50° C. to minimize side reactions, and at a pressure at which the chlorine is in the liquid phase, and recovering pentachlorobenzal chloride from the reaction mass.

10. A process for forming trichlorobenzotrichloride which comprises dissolving trichlorotoluene in liquid chlorine, and in the presence of light, maintaining a temperature at which the chlorine replaces hydrogens in the methyl group of the trichlorotoluene as the primary reaction and not in excess of about 50° C. to minimize side reactions, and at a pressure at which the chlorine is in the liquid phase, and recovering trichlorobenzotrichloride from the reaction mass.

11. A process for forming trichloroethyl pentachlorobenzene which comprises dissolving ethyl pentachlorobenzene in liquid chlorine, and in the presence of light, maintaining a temperature at which the chlorine replaces hydrogens in the ethyl group of the ethyl pentachlorobenzene as the primary reaction and not in excess of about 50° C. to minimize side reactions, and at a pressure at which the chlorine is in the liquid phase, and recovering trichloroethyl pentachlorobenzene from the reaction mass.

12. A process for forming di(dichloromethyl)-tetrachlorobenzene which comprises dissolving tetrachloroxylene in liquid chlorine, and in the presence of light, maintaining a temperature at which the chlorine replaces hydrogens in the methyl groups of the tetrachloroxylene as the primary reaction and not in excess of about 50° C. to minimize side reactions, and at a pressure at which the chlorine is in the liquid phase, and recovering di(dichloromethyl)-tetrachlorobenzene from the reaction mass.

FRANCIS EARL LAWLOR.

REFERENCES CITED

The following references are of record in the file of this patent:

UNITED STATES PATENTS

| Number | Name | Date |
| --- | --- | --- |
| 1,191,916 | Brooks et al. | July 18, 1916 |
| 1,219,166 | Schmidlin et al. | Mar. 13, 1917 |
| 2,010,841 | Bender | Aug. 13, 1935 |
| 2,132,361 | Osswald et al. | Oct. 4, 1938 |
| 2,193,823 | Levine et al. | Mar. 19, 1940 |
| 2,276,951 | Fisher | Mar. 17, 1942 |
| 2,440,731 | Vining et al. | May 4, 1948 |
| 2,464,769 | Reiff | Mar. 15, 1949 |

OTHER REFERENCES

Ellis: Chemistry of Petroleum Derivatives, vol. I, (1934), pages 769, 778, 779.